June 18, 1963    J. P. GAGLIARDO    3,094,171
FOAM NOZZLE
Filed March 24, 1958    2 Sheets-Sheet 1
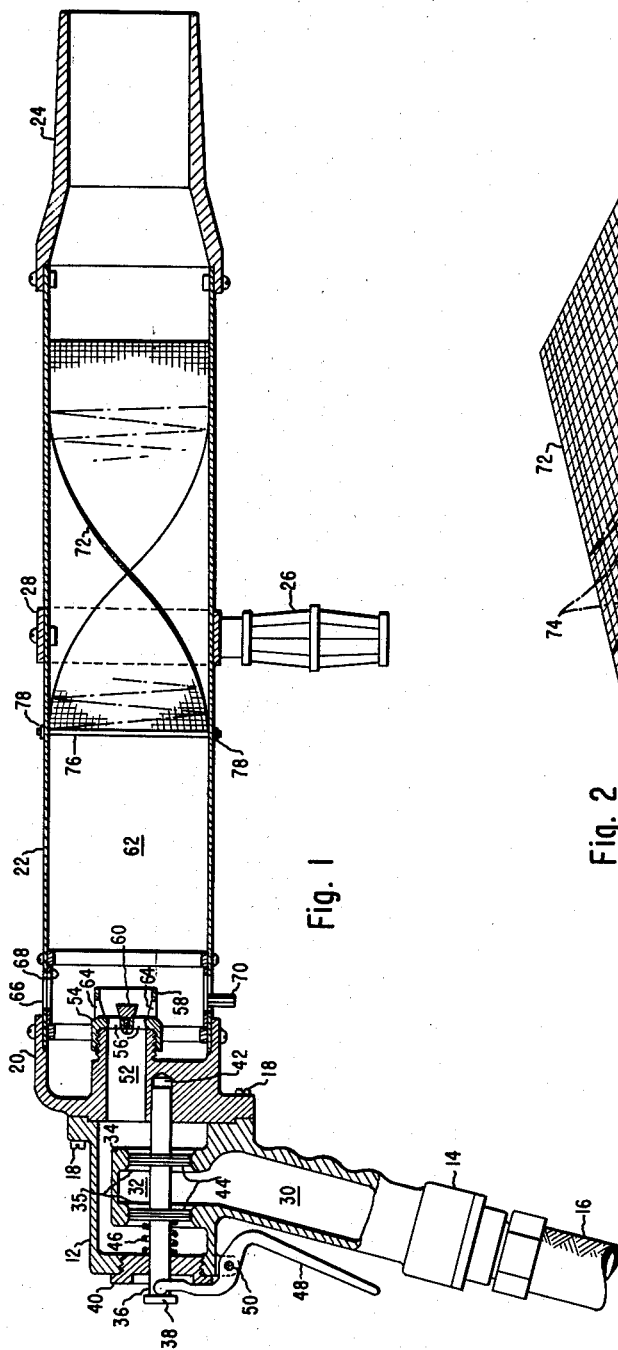
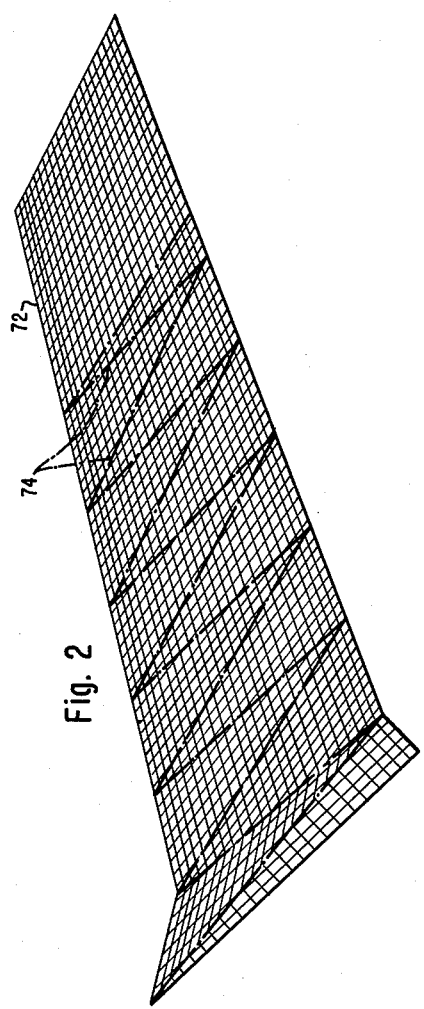
INVENTOR.
JOHN P. GAGLIARDO
BY KENWAY, JENNEY, WITTER & HILDRETH
ATTORNEYS June 18, 1963     J. P. GAGLIARDO     3,094,171
FOAM NOZZLE
Filed March 24, 1958
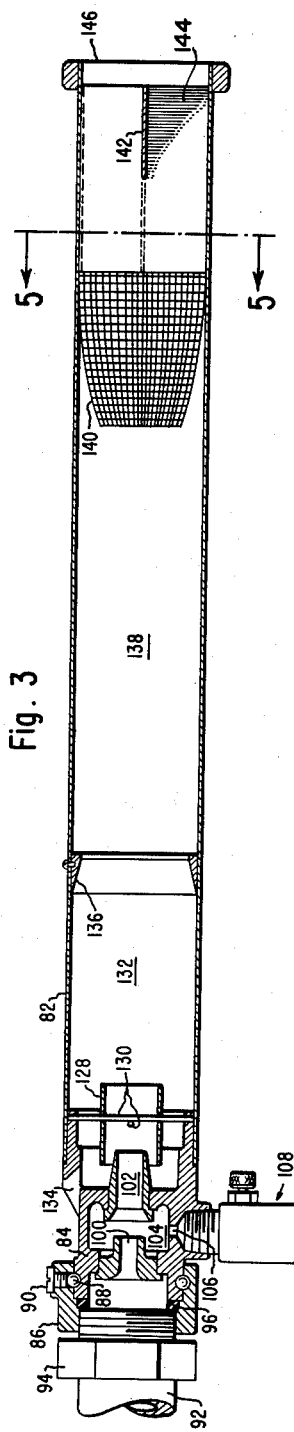
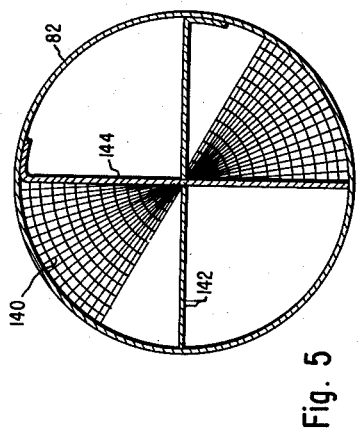
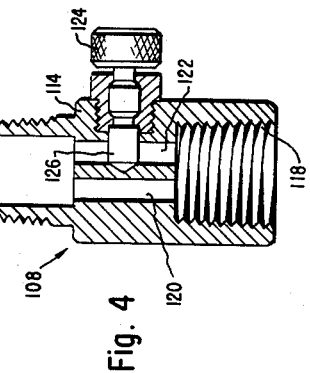
INVENTOR.
JOHN P. GAGLIARDO
BY KENWAY, JENNEY, WITTER & HILDRETH
ATTORNEYS

United States Patent Office 3,094,171
Patented June 18, 1963

3,094,171
FOAM NOZZLE
John P. Gagliardo, Shrewsbury, Mass., assignor, by mesne assignments, to The Gamewell Company, Newton, Mass., a corporation of Delaware
Filed Mar. 24, 1958, Ser. No. 723,398
7 Claims. (Cl. 169—15)

The present invention relates generally to nozzles for projecting fire fighting fluids, and more particularly to nozzles for forming and ejecting large quantities of foam, especially foam for fighting fires of highly flammable materials such as fuels.

Foam of this type generally consists of masses of small bubbles of air each surrounded by a film comprising a mixture of water and foam liquid. It is effective to smother fires of highly flammable materials. Such foam also provides a cooling effect, whereby fire fighting personnel may be permitted to bring their equipment close to the fire and the spread of the fire to unburned materials may be effectively prevented. The properties and advantages of foam are described in the patent to Freeman No. 2,302,021 and the patent to Freeman and Hencinski No. 2,492,037. The principal object of this invention is to provide a more efficient and improved nozzle for forming and ejecting a stream of such foam at high volume rates.

It is well known that the making of suitable foam requires, first, the mixing of water and foam-forming liquid in the proper proportions, second, the entrainment of air in intimate physical relation to the water-foam liquid mixture, and third, the agitation of the air and mixture to produce a large volume of foam. In general, for the greatest volume of foam without sacrifice in foam quality, the optimum ratio in volume of air to volume of liquid is somewhere between eight to one and twelve to one. As taught in said Patent 2,492,037, an improved foam is produced by causing the mixture to pass first through a fog generating nozzle or nozzles whereby a mist or fog of small droplets is formed, this mist or fog having a large "effective area" and being capable of aspirating air into the nozzle at a rapid rate. A stream of fog is then caused to impinge upon a suitable mesh or screen to create further agitation and thereby to entrain the air in masses of very small bubbles.

Hitherto, flat or generally spherical-shaped wire mesh screens have been employed to perform the third step above mentioned. In general, these screens are so situated in relation to the fog stream that the particles or droplets of the mixture strike the screen only once on the average. This limits the effect of the screen mesh in causing the turbulence in the mixture which is necessary to make foam. A second object of this invention is to provide an improved screen for causing turbulence in the stream, whereby enhanced contact of the stream with the screen is assured by disposition of said screen in substantial depth relative to the path of travel of the stream.

Further objects of the invention are to provide a compact structure of relatively simple design to accomplish the objects above noted, and to improve the reliability of the nozzle.

With the above and other objects in view, the features of the invention include the provision of a novel form of screen for producing foam. This screen consists in general in a helically-twisted, bent or formed wire mesh adapted for insertion in the nozzle. With this structure greatly enhanced turbulence in the water-foam liquid mixture occurs due to multiple contacts of many of the particles with the mesh, whereby the entrained air is efficiently utilized in the formation of bubbles of foam.

According to another feature, the water-foam liquid mixture is first converted into a fog or spray of very small droplets, this fog being in turn directed at the foam producing screen. The production of fog increases the rate of aspiration of air and also the efficiency of foam formation. The arrangement of the parts of the nozzle for generation of fog in relation to the air aspiration ports is adapted to achieve the optimum combination of fog formation and air aspiration, thereby achieving the best results from the foam producing screen.

Other features of the invention reside in certain details of construction, modes of operation and arrangements of the parts which will become clear from the following description of preferred embodiments for hand support, having reference to the appended drawings illustrating the same.

In the drawings, FIG. 1 is a longitudinal elevation in section of a foam nozzle adapted to be held in the hand and embodying the invention;

FIG. 2 is a view illustrating the method of forming the foam-producing screen of FIG. 1;

FIG. 3 is a longitudinal elevation in section of a second embodiment of the invention adapted to be held in the hand;

FIG. 4 is an elevation in section illustrating a detail of the foam liquid intake regulator 108 of FIG. 3; and FIG. 5 is an end elevation in section taken on line 5—5 of FIG. 3.

Referring to FIGS. 1 and 2, a so-called "handline" nozzle for a stream of foam is illustrated as being constructed with a pistol grip housing 12. The housing is connected through a suitable fitting 14 with a flexible hose 16, the hose extending to a source of water and foam liquid mixed in the proper proportion. The member 12 is screwed by cap screws 18 to a member 20, the latter member forming an end support for a nozzle tube 22. The tube 22 supports a stream shaper tube 24 at the opposite end. A suitable handle 26 is secured to an external ring 28 mounted at a convenient intervening position on the tube 22 to permit direction of the nozzle by the operator.

The water-foam liquid mixture enters the nozzle through a space 30 in the pistol grip of the housing 12, the space 30 being contiguous with a space 32 formed by an inwardly extending hub 34 of the member 12. The hub 34 has two valve seats 35 of equal area. A valve spindle 36 having a head portion 38 is slidably received through an end adapter 40 threaded on the member 12, an end of the spindle passing into a hollow recess 42 formed in the member 20. This spindle is secured to a pair of spaced valve members 44 respectively cooperating with the valve seats 35. A compression spring 46 bears at one end on the adapter 40 and at the other end on one of the valves 44. A trigger 48 pivoted at 50 on the member 12 has an integral extension adapted to bear upon the head 38 of the valve spindle 36. When foam is desired, the operator merely squeezes the trigger 48 which moves the spindle leftwardly as illustrated against the reaction of the spring 46 and permits the water-foam liquid mixture to enter the nozzle.

It will be understood that the above arrangement of dual valves 44 provides a balanced condition in which the pressure in the space 32 produces an equal thrust in both directions on the spindle 36; therefore, the position of the spindle is independent of the applied liquid pressure and is determined only by the relative force of the pressure applied to the trigger 48 by the operator and that of the spring 46.

With the valve open, the mixture of water and foam liquid enters a tubular passage 52 in the member 20. At the end of this passage there is secured a fog-producing attachment consisting of a threaded cap 54. The cap 54 has four equal openings 56 disposed in a circle with an integral tubular aspirator section 58. A truncated conical deflector hub 60 is secured by a screw to the central portion of the cap 54.

The four streams passing through the openings 56 emerge from the space defined by the extension 58 into a space 62 in a generally fan-shaped formation due to their impingement on and deflection by the hub 60. The hub 60 also converts each stream of liquid mixture to a fog or spray of very fine droplets. As they reach the space 62, the streams also merge into a single generally fan-shaped or diverging fog or spray pattern.

The section 58 of the cap 54 is provided with a number of aspirating holes 64 which are disposed adjacent a number of aspirating holes 66 in the tube 22. A perforated aspirator adjuster ring 68 is slidably supported within the tube 22, and has an adjustment stud 70 projecting through a slot in the tube 22 to provide means to adjust the effective opening of the holes 66. As the mixture moves through the passage within the section 58, air enters the holes 66. Part of this air passes through the holes 64 and becomes mixed with the spray downstream of the deflector hub 60. As the fog emerges into the space 62 additional air enters the holes 66, thereby forming a thorough mixture of air and water-foam liquid fog. It will be understood that within the space 62 the fog has an effective area substantially equal to the cross sectional area of the tube 22 and that its aspirating effect is very great. Thus the arrangement of aspirating ports is such as to introduce air in large amounts by virtue of this full effective area, as well as to introduce air at the point where impingement of the four streams upon the hub 60 occurs.

The fog or spray then impinges on a foam producing member 72 which is preferably formed of a piece of wire mesh screen as shown in FIG. 2. Preferably, the screen is formed of woven wires of noncorrosive metal such as stainless steel, and is bent along lines 74 which permit it to be developed into a generally helical shape having a total twist of 180 degrees. One end of the member 72 is secured to a rod 76 extending diametrically across the tube 22. The rod 76 is secured to the tube by nuts 78 threaded onto the ends of the rod.

The member 72 causes the stream of spray to be thoroughly agitated by multiple contacts of the particles of fog with the wires of the screen. The process of agitation causes the formation of many small bubbles of foam, that is, air surrounded by film of foam solution. The foam is of relatively high expansion or low liquid content per unit volume and is therefore of high quality.

The foam leaving the member 72 is directed through the stream shaper tube 24 which in the illustrated form slightly reduces the diameter of the stream, thereby increasing its velocity and throwing power. It will be understood that other forms of stream shapers may also be employed, and that in some cases a very wide angle stream may be employed.

FIGS. 3 to 5 illustrate a second embodiment of the invention embodied in a foam nozzle to be held in the hand. The nozzle is provided with a nozzle tube 82. An end member 84 is secured to one end of the tube 82 and is provided with an inner ball race which is secured to a swivel coupling 86 by balls 88. A shoulder screw 90 is threaded into an access hole which provides a means to insert the balls in place. A tube 92 which carries water to the nozzle is provided with a nut 94 which is threaded into the coupling 86 against a resilient washer 96. The washer bears against the end face of the member 84.

The member 84 is provided with two inner annular shoulders in which are respectively received a nozzle 100 and a throat member 102. A space 104 is defined between the nozzle and throat member and has a lateral access aperture 106. A regulator 108, details of which are shown in FIG. 4, has a threaded nipple for connection to the aperture. Extending from the regulator 108 is a pickup tube 110 having an end fitting 112 of a standard type to be immersed in a container of foam liquid.

Upon the application of water pressure through the tube 92, a stream of high velocity and relatively low pressure passes through the nozzle 100, reducing the pressure within the space 104 and drawing up foam liquid through the aperture 106 by aspiration. The mixture of water and foam liquid passes through the throat 102. The ratio of the mixture may be changed, if desired, by providing a throat 102 having a smaller or larger diameter.

Details of the regulator 108 are shown in FIG. 4. It is provided with a body portion 114 having an outside threaded nipple 116 and an internally threaded portion 118. A passage 120 extends through the body. A passage 122 may be opened or closed by means of a knob 124 secured to a spindle 126.

The stream comprising a mixture of water and foam liquid which passes through the throat 102 enters a sleeve 128 coaxially supported within the tube 82. A pair of impingement wires 130 are suspended at right angles in the axis of the stream and support the sleeve 128. The wires 130 cause the stream to become turbulent and to develop diverging fog or spray which substantially fills the space 132.

The body 84 is provided with one or several ports 134 through which air is aspirated. Some of this air passes between the throat 102 and the sleeve 128, and some passes between the sleeve 128 and the tube 82. Thus the aspiration and mixture of air with the water-foam liquid mixture occurs immediately before the mixture reaches the impingement wires 130 and also after the fog or spray enters the space 132.

The fog or spray then passes through a ring 136 having a converging truncated conical inner surface whereby it is converged to a point approximately midway of a space 138 in the tube 82. The flow pattern produced by the ring 136 is generally X-shaped and assists in mixing of the foam solution with the air.

The fog or spray then strikes a foam developing member 140 supported by and within the tube 82. The member 140 comprises a woven wire screen substantially like the screen 72 of FIG. 2, except that it is twisted or developed to subtend an angle of 60 degrees in only two opposing quadrants of the cross-section. The member 140 is held in place by a pair of spacer elements 142 and 144 each of which is slotted to receive the other, the spacers 142 and 144 being received into the end of the tube 82 and the member 144 preferably being secured to an end of the member 140 by brazing, welding or the like.

That portion of the fog or spray which strikes the member 140 is deflected in many directions and impinges upon the portion which is directed through the open area of the screen. In this case, as in the embodiment of FIG. 1, a foam generating action occurs, this action being enhanced as in the case of FIG. 1 by the fact that the impingement member 140 has a substantial dimension longitudinally of the tube 82, whereby many of the droplets of fog or spray strike more than one part of the member 140 in passing through the nozzle.

The space within the tube 82 between the member 140 and the end 146 constitutes a stream-shaping portion divided by the mutually perpendicular members 142 and 144.

From the foregoing description of two embodiments of the invention designed for different fire-fighting applications, it will be recognized that in each case a foam generating member is inserted within the body of the nozzle and comprises a screen-like element. This element is arranged to have a substantial dimension along the axis of the nozzle, and is developed into a shape subtending a substantial angle when viewed in end elevation. The result is a very efficient foam generating action, which is especially effective when the impinging stream is a fog or spray consisting of a thorough mixture of water and foam liquid in proper proportions and projected at high velocity against the foam generating member. A nozzle constructed according to the invention is comparatively simple and inexpensive, especially in respect to the foam generating screen-like member.

It will be further recognized that while the invention has been described with reference to specific structures, these may be modified or otherwise adapted or arranged by one skilled in this art in accordance with recognized principles following a reading and understanding of the teachings hereof, without departing from the spirit or scope of the invention.

Having thus described the invention, I claim:

1. A foam nozzle for fire-fighting apparatus having, in combination, a tube, a foam producing element fixed to and within the tube, said element having edges lying generally in helixes coaxial with the tube, means to project a spray consisting of a mixture of water and foam liquid against said element, said element consisting of a screen having a number of transverse wire elements each lying approximately in a diameter of the tube, said wire elements being progressively longitudinally displaced along and angularly displaced about the axis of the tube, said element combining the water and foam liquid with air to form foam, and a shaper tube to discharge all of the material passing through said element in a stream.

2. The combination according to claim 1, wherein the spray is projected on to said element without substantial rotational velocity about the tube axis.

3. A foam nozzle for fire-fighting apparatus having, in combination, a tube, a foam producing element fixed to and within the tube, means to project a spray consisting of a mixture of water and foam liquid against said element, said element comprising a strip of wire mesh arranged so that the edges of the strip follow generally helical paths about the axis of the tube, said element combining the water and foam liquid with air to form foam, and a shaper tube to discharge all of the material passing through said element in a stream.

4. A foam nozzle for fire-fighting apparatus having, in combination, a tube, a foam producing screen fixed to the inner wall of the tube, said screen consisting of a piece of wire mesh having the wires in one dimension thereof substantially straight, transverse to the axis of the tube and progressively angularly displaced about said axis, the wires in the other dimension of said mesh being shaped substantially in helixes having said axis in common, means to project a spray consisting of a mixture of water and foam liquid in fine droplets through said tube from one end thereof against said element, said screen combining the water and foam liquid with air to form foam, and a shaper tube to discharge all of the material passing through said screen in a stream.

5. A foam nozzle for fire-fighting apparatus having, in combination, a tube, a foam producing screen fixed to the inner wall of the tube, said screen consisting of a piece of wire mesh having the wires in one dimension thereof substantially straight, transverse to the axis of the tube and progressively angularly displaced about said axis, the wires in the other dimension of said mesh being shaped substantially in helixes having said axis in common, means to project a spray consisting of a mixture of water and foam liquid in fine droplets through said tube from one end thereof against said element, said tube being provided with air aspirator means adjacent said spray projecting means to cause said droplets to be mixed intimately with air when striking said screen, said screen combining the water and foam liquid with air to form foam, and a shaper tube to discharge all of the material passing through said screen in a stream.

6. A foam nozzle for fire-fighting apparatus having, in combination, a tube, a foam producing screen fixed to the inner wall of the tube, said screen consisting of a piece of wire mesh having the wires in one dimension thereof substantially straight, transverse to the axis of the tube and progressively angularly displaced about said axis, the wires in the other dimension of said mesh being shaped substantially in helixes having said axis in common, and means to project a spray consisting of a mixture of water and foam liquid in fine droplets through said tube from one end thereof against said element, the other end of said tube forming a stream shaper for the foam and discharging all of the material passing through said screen in a stream.

7. A foam nozzle for fire-fighting apparatus having, in combination, a tube, a foam producing element fixed to and within the tube and having a plurality of wires forming a screen, said element having a plurality of reverse bends to cause the parallel wires in one dimension thereof to approach helical lines coaxial with the tube, means to project a spray consisting of a mixture of water and foam liquid against said element, said element combining the water and foam liquid with air to form foam, and a shaper tube to discharge all of the material passing through said element in a stream.

References Cited in the file of this patent

UNITED STATES PATENTS

| | | |
|---|---|---|
| 1,900,501 | Hunt et al. | Mar. 7, 1933 |
| 2,164,153 | Friedrich | June 27, 1939 |
| 2,712,520 | Nester | July 5, 1955 |
| 2,766,026 | Boyd | Oct. 9, 1956 |
| 2,774,583 | Haftke | Dec. 18, 1956 |

FOREIGN PATENTS

| | | |
|---|---|---|
| 54,162 | Netherlands | Mar. 15, 1943 |